March 5, 1968 J. R. SPARKS 3,372,295
AIR PROPORTIONAL ALPHA DETECTOR
Filed March 3, 1966

INVENTOR.
James R. Sparks
BY
Attorney

United States Patent Office 3,372,295
Patented Mar. 5, 1968

3,372,295
AIR PROPORTIONAL ALPHA DETECTOR
James R. Sparks, Albuquerque, N. Mex., assignor to the United States of America as represented by the United States Atomic Energy Commission
Filed Mar. 3, 1966, Ser. No. 533,387
2 Claims. (Cl. 313—93)

ABSTRACT OF THE DISCLOSURE

An air proportional alpha detector having a removable screen sealed with an aluminized "Mylar" film removably mounted on a metal coated plastic housing, and a removable detector unit positioned within the housing adjacent the screen and including a plurality of longitudinal channels each having a wire independently suspended along the channel and an aluminized Mylar film seal adhesively bonded over the channels sealing the detector unit.

---

This invention relates primarily to alpha detectors and more particularly to air proportional alpha detectors. It will be obvious, however, that some of the features herein disclosed may be adapted to proportional type detectors for beta and gamma radiation.

An alpha detector is basically a device which detects the presence of alpha particles or alpha rays. An alpha ray is a positively charged particle emitted by various radioactive materials, made up of two neutrons and two protons. An alpha particle may also be characterized as being the nucleus of a helium atom, or a helium atom stripped of its orbiting electrons. It is the least penetrating of the three common forms of radiation, alpha, beta, and gamma rays.

An air proportional alpha detector is one type of instrument used to detect these particles. As the positively charged alpha particles travel through a gaseous medium they collide with electrons, knocking the electrons free from their atoms, thus producing ions. The free electrons in turn, depending on their speed, the strength of an electric field imposed upon them, and the pressure of the gas, ionize other atoms in the atmosphere, and cause what is known as gas amplification. The free electrons, in the field of a wire anode having a positive bias, are attracted by and pulled to said anode. In the pressure and voltage range at which air proportional probes operate it is found that the size of a given pulse is proportional to the number of primary ions created in the sensitive volume of the probe by the primary event.

As indicated by its name, the air proportional probe uses air at atmospheric pressure for its ionizing gas. Other proportional-type probes may use gases at pressures varying from less than atmospheric to greater than atmospheric.

The known devices usually comprise a housing or shell for a continuous piece of wire anode or collector upon which free electrons may impinge and a screen placed above the collection surface containing "windows" through which the particles must pass to get to the sensitive volume near the collector. The voltage source and amplification system are usually within another housing, connected by cable to the probe. Because the alpha particle has such low penetration capabilities, it is desirable that the film or membraneous covering for the windows be very thin. Thin sheets of mica, various metal foils, which have generally been not wholly satisfactory, and various organic films have been used. The present invention uses, as window material, a "Mylar" film, which may typically be about 0.00025 inch in thickness, coated on both sides with aluminum. In this type probe, where ambient atmospheric pressure is used, it is obvious that a window or windows of greater size may be used than in other types of counters which use pressure other than ambient atmospheric.

Over a period of time, depending on the amount of exposure to radiation, the screen becomes contaminated and will not detect alpha rays with a desirable degree of accuracy. The radiation contamination may increase cumulatively over a period of time and erroneously increase the background radiation and thus may tend to give a false comparison. Therefore the screen is periodically removed from the unit and cleaned. This, of course, becomes a very time consuming and expensive process when a laboratory or a company must maintain several hundred counters. If, however, one has a screen which is inexpensive, easily removed, and disposable, much time and expense may be saved.

In radiation counters, of both the Geiger-Muller type and the proportional type, a single wire anode was, and in many instances still is, used. In the particular field of proportional type counters, the number of wires has been increased to give increased sensitivity. This has heretofore been accomplished by simply using a long wire wound in several loops. Over a period of time the wire stretches, becomes loose, and begins to vibrate, causing noisy, microphonic effects. The noise problem is further enhanced as dust and other foreign particles enter the detector unit.

The above problems, and others, are solved by applicant's present invention, which provides an inexpensive, disposable screen, a sealed, removable detector unit having independently suspended wires, a printed circuit connecting them, and an inexpensive, lightweight housing.

It is an object of this invention to provide an air proportional alpha radiation detector having a removable, sealed detector chamber.

It is another object to provide an inexpensive disposable screen for the detector.

It is another object to provide a lightweight, sturdy or shock resistant housing for the detector.

It is another object to provide a lightweight, inexpensive detector chamber.

It is another object to provide independently mounted detector wires.

It is another object to provide printed circuits for the end plates for the detector chamber.

This specification, including the description, drawing, and claims, has been prepared in accordance with the applicable patent laws and the rules promulgated under the authority thereof.

The air proportional alpha detector 10 preferably comprises a housing 11, a screen 12, and a detector unit 13. In effect, this device comprises an alpha detector unit sealed against unusual vapors which may include water vapor, corrosive gases, dust, and other foreign material, which may tend to diminish both the life and the accuracy of the instrument, set in a metal-covered plastic housing. The housing acts as a shock absorber to protect the detector unit from mechanical impact and it also acts as an electric shield to prevent electric or electronic interference, such as RF noise, which may be generated by various laboratory instruments and equipment, from affecting the accuracy of the counter. The housing 11 may comprise a hollow plastic body such as styrene or polystyrene, which may have a thin coat of copper vapor deposited on it and a coat of nickel over the copper. A plastic case is not only lighter, but is also more sturdy or shock-absorbent than a metal case. The metallic coating serves as both an electronic shield and as a ground for the detector unit. Nickel was selected as an outer coating material because it is suitable for use in a corrosive atmosphere, such as a laboratory. The body may be slotted, as at 14, to receive the screen 12. The screen may be held in place by friction or by other suitable means, such as by machine screws or by a resiliently biased ball bearing. The slots may preferably terminate at an end wall of the housing to provide a stop for the screen.

Figure 1:
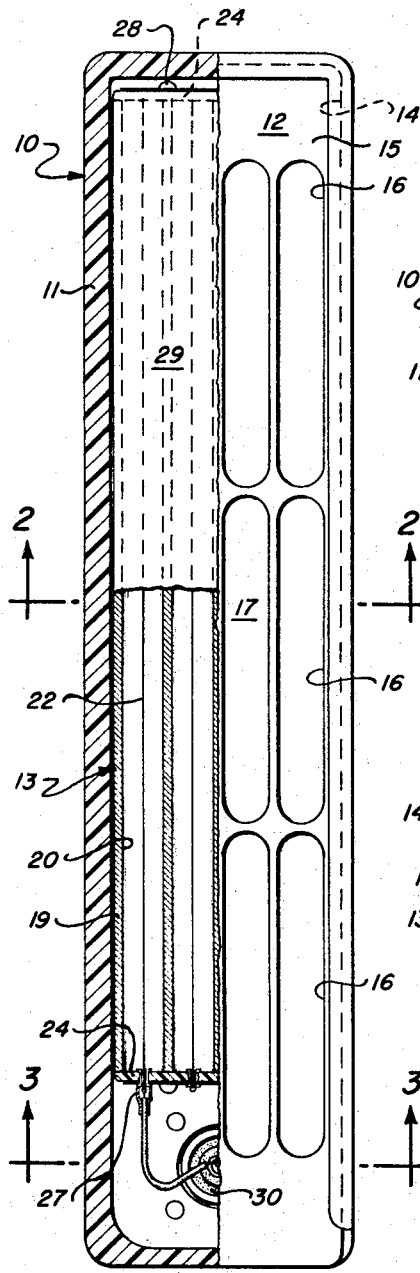
FIG. 1 is a plan view of an assembled air proportional alpha detector according to the present invention.
Figure 2:
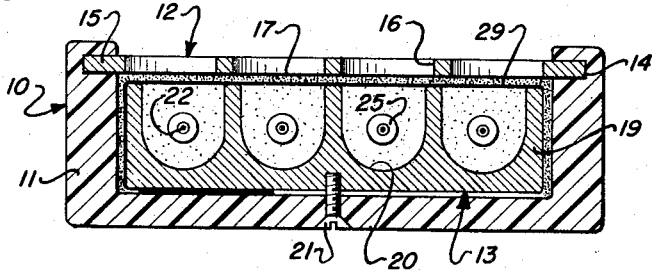
FIG. 2 is a sectional view taken along line 2—2 of FIG. 1 with components separated for clarity.

FIG. 2 shows a sectional view through the housing 11, the screen 12, and the detector or probe chamber unit 13. The unit 13 may comprise an extruded aluminum chamber 19 which may contain parallel, U-shaped channels 20 extending longitudinally of the unit. The channels, through which independently suspended wire anodes 22 may extend, serve to enhance the gas amplification and thereby provide pulses easily distinguished from noise. The top of the channel walls or ribs may provide a support to which a sealing film 29 may be secured. Fastening means, such as flat headed machine screws 21, may secure the chamber to the housing. Removal of the unit is accomplished by removing the screen and the fastening means, disconnecting the electrical connection 27 between the wires 22 and jack means 30 for the amplifier and readout means (not shown), and lifting the unit out of the housing.

Figure 3:
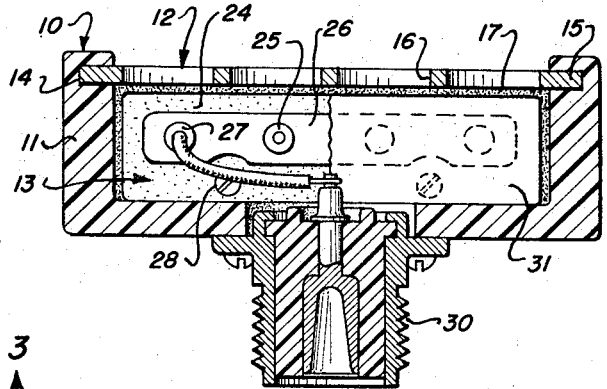
FIG. 3 is a sectional view taken along line 3—3 of FIG. 1.

The plural wires 22, which may typically have a diameter of one mil, are preferably independently mounted on the end plates 24, as shown in FIG. 3, by eyelets 25, and may be electrically connected by printed circuit means 26. The printed circuit end plates eliminate soldering inside the chamber and allow for individually wired channels. The latter feature eliminates the microphonic effect caused by the stretching of a single, long wire. A suitable terminal 27 on one end plate may connect the wires to the amplifier jack 30. Any lightweight, high strength, non-conductive and low-leakage material, such as laminated glass cloth impregnated with an epoxy resin and clad with copper on one side, may be used in the fabrication of the end plates. Suitable fastening means 28, preferably non-conducting screws, secure the end plates to the body of the unit. The end plates may be potted or coated with any suitable dielectric material 31 to prevent leakage paths from the printed circuits to the housing.

The assembled unit may be sealingly enclosed by a layer of Mylar film 29, aluminized on both sides, and adhesively bonded to the top of the probe chamber as shown in FIG. 2. A strip of the aluminized "Mylar" may extend down a side of the chamber and a folded end may be secured to the chamber bottom to assure a grounding electrical contact between the chamber 19 and the Mylar film.

The disposable screen 12 may comprise a stamped planar, generally rectangular steel form 15 having longitudinally extending "window" apertures 16 therethrough which when said screen is in position in the housing, apertures 16 are above and parallel to channels 20. A membraneous sheet or film 17, such as "Mylar," aluminized on both sides, may be adhesively secured to the underside of the screen.

The operating point or voltage at which air proportional probes operate is primarily a function of atmospheric composition, wire size, and altitude. For example, a laboratory at 6000 feet elevation, using a one mil diameter wire in a probe and having standard atmospheric conditions, would typically use about 1880 volts (D.C.) between the anode wires and the grounded housing. Using a probe in an atmosphere which contains unusual vapors, that is, gas particles other than air, such as organic solvents or corrosive gases, changes the operating point and renders a probe relatively inaccurate and useless about one-half hour after introduction of the unit to the non-standard atmosphere. The present invention, which includes the sealed probe chamber, has been used successfully and accurately for over six hours in atmospheres comprising unusual gases which have rendered prior art devices completely dead after only one-half hour.

It is readily apparent that applicant's device comprises a low weight, shock resistant, inexpensive air proportional probe. The individually mounted wires prevent or minimize microphonic effects and comprise an extremely efficient anode. The repair or maintenance is facilitated by the ease of assembly and disassembly. The disposable screen is especially advantageous because of its simplicity of design and because of its low cost. Moreover, the novel combination which comprises the present invention is deemed by actual using personnel to be far superior to any prior art devices for use where high humidity or unusual vapors are present in the operating atmosphere.

I claim:

1. An air proportional alpha detector probe comprising: a channel shaped body portion having bottom, side and end walls of nickel and copper coated plastic material and carrying an electrical terminal; screen means carried by and removably mounted on said side and end walls at locations spaced from said bottom wall, said screen means comprising a planar, generally rectangular plate having therethrough a series of longitudinally extending apertures, and a first aluminized Mylar means adhesively bonded to said screen for covering said screen apertures, said first aluminized Mylar means being in electrical contact with the nickel coating of said plastic body portion; and a detector chamber portion removably mounted under said screen means within said channel shaped body portion comprising a plurality of longitudinally extending channel means aligned with and parallel to the apertures of said screen means, end portions for said chamber portion, wire anode means extending between said end portions, mounting means on said end portions for independently mounting said wire means and suspending said wire means singly in said channel means, printed circuit means mounted on said end portions for interconnecting the independently mounted wire means, a second aluminized Mylar means adhesively bonded to said channel means and end portions for sealing and covering said channel means, said second aluminized Mylar means being in electrical contact with the nickel coating of said plastic body portion, means for securing said chamber to said body portion and detachable coupling means connected to said printed circuit means for connecting said wire means to said body portion terminal.

2. The air proportional alpha detector probe of claim 1 wherein said screen means is slidably mounted in longitudinal slots in said side walls.

References Cited

UNITED STATES PATENTS

| 2,532,956 | 12/1950 | Simpson | 313—93 |
| 2,793,309 | 5/1957 | Simpson | 250—83.6 X |
| 2,871,366 | 1/1959 | Hill | 250—83.6 |
| 2,965,759 | 12/1960 | Eberline | 313—93 |
| 3,296,478 | 1/1967 | Ichinokawa | 313—93 |

OTHER REFERENCES

Simpson, "Air Proportional Alpha Counters," 1947, title, 9, 10, 13, 14, 15, 20, 26, 27.

JAMES W. LAWRENCE, *Primary Examiner.*

R. L. JUDD, *Assistant Examiner.*